(No Model.) 2 Sheets—Sheet 1.

B. A. REYNOLDS.
POTATO DIGGER.

No. 521,940. Patented June 26, 1894.

Witnesses:
Louis Clark.
E. Behel.

Inventor:
Bloomer A. Reynolds
By A. O. Behel
Atty.

(No Model.) 2 Sheets—Sheet 2.

B. A. REYNOLDS.
POTATO DIGGER.

No. 521,940. Patented June 26, 1894.

Witnesses:
Louis Clark.
E. Behel.

Inventor:
Bloomer A. Reynolds
By A. O. Behel
Atty.

UNITED STATES PATENT OFFICE.

BLOOMER A. REYNOLDS, OF ROCHELLE, ILLINOIS.

POTATO-DIGGER.

SPECIFICATION forming part of Letters Patent No. 521,940, dated June 26, 1894.

Application filed March 6, 1894. Serial No. 502,596. (No model.)

*To all whom it may concern:*

Be it known that I, BLOOMER A. REYNOLDS, a citizen of the United States, residing at Rochelle, in the county of Ogle and State of Illinois, have invented certain new and useful Improvements in Potato-Diggers, of which the following is a specification.

The object of this invention is to construct a potato digger which is supported upon carrying wheels, and provided with hand levers for regulating the running depth of the plow and raising the same free of the ground for transportation.

Figure 1:
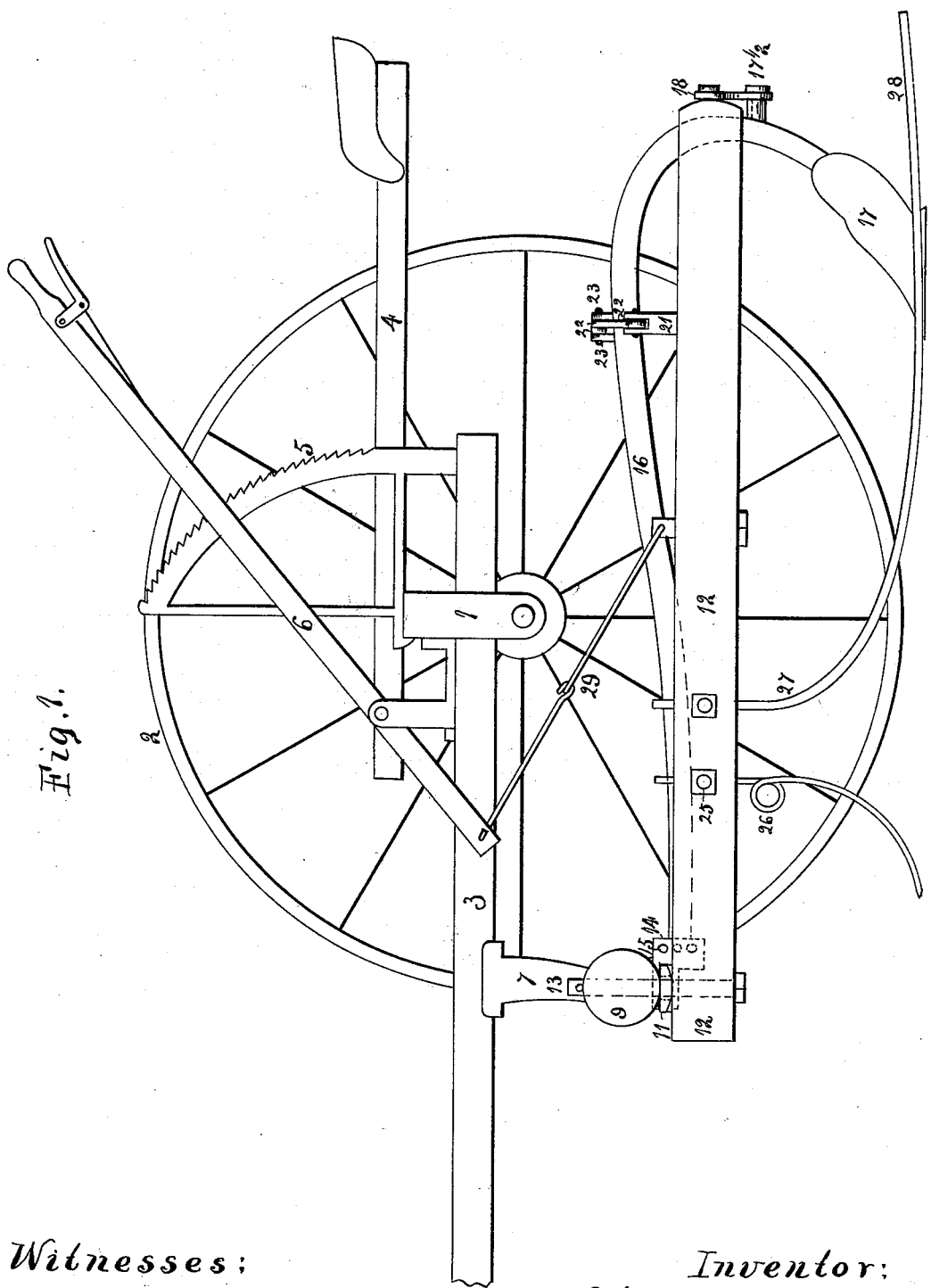
Figure 3:
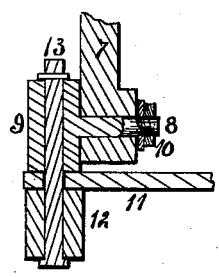
Figure 2:
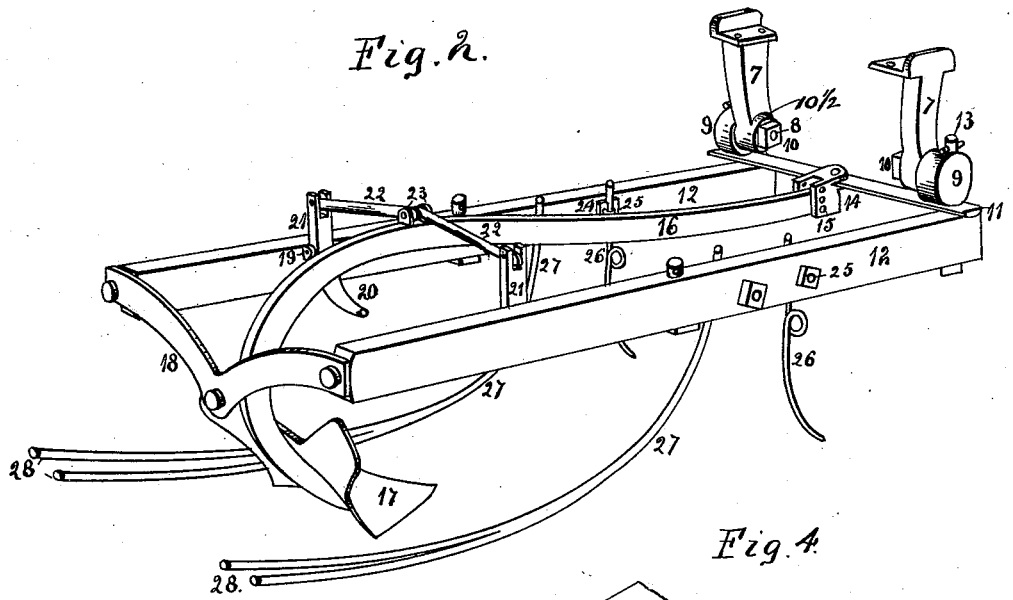
Figure 4:
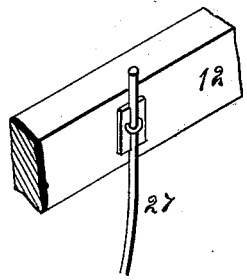

In the accompanying drawings, Figure 1, is a side elevation of my improved potato digger, in which one of the carrying wheels has been removed to more clearly show the parts. Fig. 2, is a perspective view of the plow and its connections as seen from the rear. Fig. 3, is a transverse section on dotted line $a$, Fig. 2. Fig. 4, is an isometrical representation of the mode of support for the rod 27.

My improved potato digger may be applied to the various constructions of riding cultivator frames, and the one in this instance consists of the axle 1, supporting wheels 2, and a tongue composed of bars 3, meeting at their forward ends in such manner as to receive the neckyoke; a seat supporting frame 4, having a connection with the bars composing tongue, near their junction with the axle, and resting upon the upper face of the axle, and ratchet tooth segments 5, having connections with the upper face of the axle, and supported by that portion of bars 3, projecting rearwardly from axle. Hand levers 6, provided with the usual thumb latches, having a pivotal connection near their forward end with the supporting frame, and an engagement with the ratchet teeth of segments. To the under side of the bars 3, forming the tongue are secured pendants 7, their lower ends formed with transverse openings, which receive the studs 8, projecting from the head 9, and held in place by nuts 10, and washers $10\frac{1}{2}$ on their inner ends. These heads 9, are provided with vertical openings, and rest upon cross bar 11, connecting the two heads 9, which bar in turn rests upon drag bars 12, extending in the lengthwise direction of the machine, and pins 13, passing upward through drag bars 12, cross bar 11, heads 9, are held in place by keys passing through their upper ends, and nuts and washers on their lower ends, thereby forming a connection between the drag bars and tongue frame, and a connection between the drag bars, in such manner that the drag bars may be moved in a vertical plane, and also in a horizontal plane. The under side of cross bar 11, at point of contact with drag bars 12, being rounded, and the openings in cross bar 11, through which the pins 13, passes are slightly elongated transversely of the bar in order that the drag bars may have vertical movement independent of each other.

To the cross bars 11, midway of its length is pivoted a clevis, provided with side plates 14, and a vertical series of holes 15. Between these side plates is located the front end of a plow beam 16, which is held in place by a pin passing through one of the series of vertical holes, and a corresponding one of a similar series of holes in the front end of the plow beam 16. The rear end of this plow beam supports a double mold board plow 17, which is located centrally at a point near and below the rear end of the drag bars, and has a connection therewith through the medium of a cross bar 18, which has a pivotal connection at each end with the drag bars 12, at their rear ends; and a pivotal connection with the rear side of the plow beam 16, at a point slightly above, the double mold board plow 17, such connection consisting of a bolt $17\frac{1}{2}$ with sleeve, this sleeve in position on bolt between plow beam 16, and cross bar 18, at a point in the center of cross bar 18. Such connection will impart to the plow 17, the same movement that is imparted to drag bars 12 while the leaf on bolt is to maintain cross bar 18, in position at a point somewhat in the rear of plow beam 16.

To the inner faces of the drag bars, at a point some distance from the rear ends thereof, are secured brackets 19, to which are pivoted levers composed of longer, lower curved portions 20, and shorter, upper portions 21, having their extreme upper ends vertically slotted, between the ears of which are pivoted links 22, the other ends of the links having a pivotal connection with the upper face of the plow beam 16, by means of the ears 23, rising therefrom.

It will be noticed that the forward end of the plow beam 16, in its connection with the clevis 14, is held rigid as far as any oscillatory movement is concerned. It will also be noticed that the position of the attendant, and the construction and arrangement of levers 20, and drag bar 12, are such, that in easy working soil no changing of the normal level position of plow shares will be needed to secure lateral movements of the plow 17, and the plow beam and plow being held rigid oscillatorily the attendant can produce sufficient lateral movement of the plow by placing his feet upon the curved portion of levers 20, close to the point of contact of the levers with brackets 19, and cause the drag bars 12, and plow beam 16, and mold board 17, to move in either direction laterally, as he may desire, by direct pressure of either foot more firmly than its fellow in the direction of the desired movement, but in case it should be necessary in hard working soil to exert more force to give lateral motion to the plow, moving the feet farther toward the ends the curved portions of the levers 20, and pressing upon the levers on the side toward which it is desired to move the plow gives instant movement of plow in that direction. For the attendant by pressing his right foot upon the inner end of the curved portion of the right hand lever 20, with more force than is exerted upon the opposite lever 20, causes through the medium of right hand link 22, that portion of plow beam at point of contact of right hand link 22, through the medium of ears 23, rising therefrom to be moved to the left of its normal position, and so imparting a twisting, springing movement to that part of plow beam between its point of contact with clevis 14, and point of contact with ears 23, and such movement of plow beam to the left will cause that portion of plow beam below its point of contact with cross bar 18, to be moved in a slightly less direction to the right, such movement of plow beam causing the right hand share of double mold board plow 17, to be slightly elevated above its normal level position, and the left hand plow share correspondingly depressed, such movement of plow beam being allowed by its pivotal connection with cross beam 18, and the plow will assume its normal level position the instant pressure is released, and like motion in the opposite direction being imparted by the attendants pressing the left foot more firmly upon the curved portion of the left hand lever 22, near its end. The use of the levers in the manner set forth giving the attendant perfect control of lateral movements of the plow 17, for pressure upon the right hand lever causes the resistance of the right hand side of plow share and mold board to be lessened, and the resistance on the left hand side to be correspondingly increased, thereby rendering it comparatively easy to move plow, &c., to the right or vice versa as the case may be. It will also be noticed that the same force that is exerted to depress either lever 20, to give lateral movement to plow, is also exerted in the most direct way to produce the desired result independent of the action of levers 20, and connections.

To the inner side of the drag bars near their forward ends are secured spring teeth 26, which extend downward so as to rest nearly upon the surface of the soil, in such manner as to lightly brush the tops of vines, weeds, &c., lying at either side of the potato row, and cause them to lie in a line more nearly parallel with the row so as to lessen the liability of plow to choke up in green and tough vines, weeds, &c., the connection being made by plates 24, and eye bolts 25, extending through the drag bars, receiving a washer and nut on their outer ends, which will firmly clamp the teeth of the drag bar, and the construction of plates and eye bolts is such that the spring teeth may be adjusted in any direction, forwardly, or rearwardly, up or down, closer to the row, or farther away, at will, to suit every condition of work.

In front of the plow and to the inner face of the drag bars are secured rods 27, which extend downward and rearward, diverging into rods 28, at a point slightly in front of the plow, and extending alongside of, and rearwardly from the plow on either side of it upon or near the surface of the soil. The connection being made by means of plates 30, and eye bolts 31, extending through the drag bars and receiving a washer and nut on their outer ends, which will firmly clamp the rods to the drag bars. The construction being such that the rods are adjustable in every direction, so that their rear ends may be raised, or lowered, moved closer to, or farther from the plow 17, to suit every condition of work. The adjustment is such that the plow turning furrows which fall upon rods 28, the friction of the surface of the soil underneath the rods 28, the vibrating motion imparted to rods 28, by the falling of earth, vines, roots, &c., lightly clinging to the raised, rear portion, of rods completes the separation of earth and potatoes begun by the plow.

The hand levers 6, have a connection with the drag bars by means of the links 29. The construction is such that drag bars 12, may be raised or lowered independently of each other to a limited degree, and not change the normal level position of bottom of plow shares. The construction is such that the front end of plow beam may be raised or lowered to give the required downward tendency of plow shares, by means of the vertical row of holes in side plates of clevis and corresponding holes in front end of plow beam. The construction is such that ratchet toothed segments 5, are secured more firmly by means of support given by portion of side bars forming tongue projecting rearwardly from the axle such firmness giving more stability to hand levers 6, which in turn is imparted to drag bars 12. The construction is such that the running depth of plow is practically the same whether it is in the center of the line of draft or as far to either side of it as is necessary for practical purposes.

I claim as my invention—

1. In a potato digger, the combination of a supporting frame, two drag bars having a pivotal connection therewith, a plow beam located between the drag bars having a connection therewith at each end, and supporting a plow.

2. In a potato digger, the combination of a supporting frame, two drag bars having a connection therewith, a cross bar connecting the forward ends of the drag bars, a plow beam having a connection with the drag bars at its forward end, and a bar having a pivotal connection with the rear ends of the drag bars and a pivotal connection with the rear end of the plow beam.

3. In a potato digger, the combination of a supporting frame, two drag bars having a connection therewith, a cross bar connecting the forward ends of the drag bars, a plow beam having a connection with the cross bar, a bar having a pivotal connection with the rear ends of the drag bars, and a pivotal connection with the rear portion of the plow beam, and foot levers supported by the drag bars having a link connection with the plow beam.

4. In a potato digger, the combination of a supporting frame, two drag bars having a pivotal connection therewith, a plow beam located between the drag bars having a connection therewith, at each end and supporting a plow, and fingers or rods having a connection with the drag bars extending alongside of the plow.

5. In a potato digger, the combination of a supporting frame, two drag bars having a pivotal connection therewith, a plow beam located between the drag bars having a connection therewith at each end, and supporting a plow, and spring teeth having a connection with the drag bars.

BLOOMER A. REYNOLDS.

Witnesses:
   A. O. BEHEL,
   E. BEHEL.